United States Patent [19]

Chambers

[11] Patent Number: 5,761,062
[45] Date of Patent: Jun. 2, 1998

[54] EXTENDED OFFSET DATA PROCESSING

[75] Inventor: Ronald Edward Chambers, Houston, Tex.

[73] Assignee: Western Atlas International, Inc., Houston, Tex.

[21] Appl. No.: 601,791

[22] Filed: Feb. 15, 1996

[51] Int. Cl.[6] .................................................. G06F 19/00
[52] U.S. Cl. ............................................................ 364/421
[58] Field of Search .............................. 364/421; 367/50, 367/51, 52, 71, 72

[56] References Cited

U.S. PATENT DOCUMENTS

| Re. 30,347 | 7/1980 | Musgrave | 367/51 |
|---|---|---|---|
| 4,980,866 | 12/1990 | Wang et al. | 367/52 |
| 5,083,297 | 1/1992 | Ostrander | 364/421 |
| 5,128,899 | 7/1992 | Boyd et al. | 367/50 |
| 5,570,321 | 10/1996 | Bernitsas | 364/421 |

OTHER PUBLICATIONS

Zisserman et al., "Identification Of Events From 3D Volumes Of Seismic Data", Image Processing—1994 International Conference, 1994, pp. 309–313, 1994.

Hubral, Peter and Krey, Theodor; "Interval Velocities from Seismic Reflection Time Measurements", pp. 13–18.

Tsvankin, Ilya and Thomsen, Leon; "Nonhyperbolic reflection moveout in anisotropic media", GEOPHYSICS, vol. 59, No. 8 (Aug. 1994), pp. 1290–1304.

Dix, C. Hewitt; "Seismic Prospecting for Oil", Harper & Brothers, New York, pp. 124–126.

*Primary Examiner*—Donald E. McElheny, Jr.
*Attorney, Agent, or Firm*—William A. Knox

[57] ABSTRACT

Wide-angle reflections that have been overcorrected using a simple two-term hyperbolic moveout correction are adjusted by application of a bi-quadratic term. The biquadratic term is derived by scanning the overcorrected reflections for residual velocity. The residual velocity is used to calculate an adjustment as a linear function of the first power of the travel time to each receiver versus the fourth power of the corresponding receiver offset.

8 Claims, 7 Drawing Sheets

EXTENDED OFFSET DATA PROCESSING

BACKGROUND OF THE INVENTION

1. Field of the Invention

A method for processing seismic reflection signals originating from earth layers that are very shallow with respect to the offset distance between an acoustic wavefield source and an array of acoustic receivers.

2. Discussion of Related Art

The art of seismic exploration for natural resources is very well known. Nevertheless, a brief tutorial follows.

An acoustic source is caused to radiate a wavefield (fire a shot) into the earth from a point at or near the surface of the earth. The wavefield may be generated by a falling weight, a small explosion from a hole in the ground, an air blast in a body of water or a chirp-signal generator that vibrates the soil. Less often, the wavefield may be triggered by an implosive device. The acoustic radiator may be a point-source or it may be an extended source that includes a multi-dimensional array of several sources arranged in a desired pattern. Hereinafter for brevity, the term "source" unless otherwise qualified means an acoustic source.

The radiated wavefield propagates in all directions, insonifying the subsurface earth layers whence the wavefield is reflected back to the surface of the earth where the reflected wavefield is detected by one or more acoustic receivers. The acoustic receivers may be of any type having a capability for converting mechanical earth-borne energy to electrical signals. Suitable receivers include for example, particle-velocity sensors (geophones), pressure sensors (hydrophones) or acceleration sensors (accelerometers). The term "receiver" includes a single instrument or a group of several electrically-interconnected acoustic receivers arranged in a desired geometric pattern at or near the surface of the earth.

The electrical signals from the receiver(s) are delivered through data transmission means to data-conditioning and archival storage channels, one channel per receiver. The data transmission means may be electrical-wireline, optical, or ethereal in nature. Acoustic data-transmission channels are also known.

The electrical signals representative of the arrival times of reflected wavefields at the respective receivers are digitized and recorded on reproducible, computer-readable recording media such as but not limited to, magnetic tapes, floppy disks, CD-ROMs or any other data-recording device now known or unknown.

The recorded data are later delivered to a processing center where the data are fed to a suitable general purpose computer which is programmed to convert the seismic data to a visual model of the earth's subsurface. Programs in the computer include formulations and algorithms that exist for the sole purpose of operating on the digitized seismic data signals to convert those signals into a different state such as the desired visual model of a volume of the earth for use by geologists is exploiting natural resources such as oil, gas or other useful products. That is, data processing algorithms exist to service the gathered data; the data are not gathered to solve some naked algorithm.

Geophysical surveys may be one- or multi-dimensional. In a two-dimensional survey by way of example but not by way of limitation, a source and an array including a plurality, such as 500, of spaced-apart receivers are emplaced along a line of survey, one receiver per data channel. The receivers, separated from one another by an interval of fifty to two hundred meters, are distributed along the line of survey at increasingly greater offset distances from the source. The range in offsets may extend from about 200 meters to the nearest receiver to several thousand meters to the most distant receiver.

Please refer to FIG. 1 where there is shown a source 10 located at or near the surface 12 of the earth. Receiver 14 of any well-known type is located coincident with source 10 at zero offset. Receivers 16 and 18 are spaced away from source 10 by offsets $x_1$ and $x_2$ respectively. Collectively, the source-receiver configuration is defined as a spread.

The two-way travel time $T_o$ of an acoustic pulse emanating from source 10 to incident point 22 on subsurface stratum 20 and reflected back to receiver 14 at zero offset, multiplied by half the average wavefield propagation velocity $V_a$ is the stratum depth of burial. The two-way travel times $T_{x1}$ and $T_{x2}$ from source 10 to the more remote receivers 16 and 18 are longer in proportion to the square of the corresponding offsets $x_1$ and $x_2$. The travel times to the respective receivers such as 14, 16, 18, recorded on corresponding time-scale traces ordered in a lateral sequence will exhibit a hyperbolic relationship as function of receiver offset. The increase in reflection time due to an increase in offset is defined as normal moveout $\Delta t$.

FIG. 2 is a raw seismic record section comprising three CMP gathers, CMP 1, CMP 2 and CMP 3, showing the hyperbolic pattern characteristic of traces uncompensated for normal moveout. The vertical axis is two-way reflection travel time in seconds; the horizontal axis represents source-receiver offset. Each of the gathers extends 6800 meters laterally.

By definition, $$\Delta t = T_x - T_o. \tag{1}$$

Given observations of $T_o$ and $\Delta t$ from seismic traces, the wavefield propagation velocity $V_s$ to a given reflector can be calculated by scanning the reflection times using any one of a number of well-known computer-aided velocity-analysis routines which are based on the relation $$V_s = X/(\Delta t[2T_o + \Delta t])^{1/2}. \tag{2}$$

The velocity from (1) is the stacking velocity. The stacking velocity is used to calculate the hyperbolic normal moveout corrections to be applied to the respective recorded reflection times as a function of the square of the travel time versus the squares of the corresponding offset distances. For isotropic media and relatively flat dips, $V_s$ approaches the RMS or average velocity $V_a$ of the formation.

Since $T_x^2 = T_o^2 + (X/V_s)^2$, the hyperbolic normal moveout correction to be applied to a given event at time $T_x$ for a given offset X is $$\Delta t = T_o([1 - \{X/V_s T_o\}^2]^{1/2} - 1). \tag{3}$$

Expansion of the square root term between brackets yields $$T_x^2 = T_o^2 + (X/V_s)^2 - (X/V_s)^4 + \tag{4}$$

Customarily, the raw seismic data harvested in the field are rectified, that is, corrected for hyperbolic normal moveout during processing by applying a first-order correction using only the first two terms of (4) such that $$T_x - T_o = \Delta t = (X/V_s)^2, \tag{5}$$

where (−) indicates that the moveout correction is subtracted from the respective travel times. The term "rectify" as used herein means application of normal moveout corrections; the term does not mean rendering alternating currents unidirectional.

Of the commercially-available computer programs for scanning gathers of seismic traces for stacking velocity, use of the VELAN® program (VELAN® is a trademark of the assignee of this invention) is preferred. FIG. 3 is an example of the output of a velocity analysis of the CMP1 gather of FIG. 2. The curve, 30, is the stacking velocity as a function of two-way reflection travel time.

The basic concepts of velocity analyses may be found in *Seismic Prospecting for Oil* by C. Hewitt Dix, 1952, Harper's Geoscience Series, pp 134–137. A similar treatise is presented by Hubral and Krey using a somewhat more sophisticated analysis in the presence of dipping horizons. See *Interval Velocities from Seismic Reflection Time Measurements*, Society of Exploration Geophysicists, 1980, pp 13–18. Tsvankin et al., in a paper entitled *Nonhyperbolic Reflection Moveout in Anisotropic Media*, published in Geophysics, v. 59, n. 8, pp 1290–1304, 1994, explore the effects of transverse anisotropy on normal moveouts associated with wide-angle reflections using a 3-term Taylor coefficients.

Customarily, after each shot, the spread is advanced along the line of survey by an integral multiple of the receiver-spacing interval. As is well known, many of the subsurface reflection ray-path midpoints are common to several successive spread advances. That is because each receiver records reflected events from several different source positions and each source insonifies receivers at several different receiver positions. The seismic traces whereon are recorded the reflected events propagating via common midpoints but different offsets, are rectified, that is corrected for normal moveout, and summed together as common mid-point gathers.

It is important that the respective traces of a gather, despite their different offsets, be accurately rectified for hyperbolic normal moveout prior to summing, otherwise the envelopes, that is the waveforms, of the summed signals will be distorted. Loss of waveform fidelity of an earth model due to application of imprecise moveout corrections wreaks havoc with the geologic interpretation of the processed seismic data using routines such as studies of amplitude versus offset (AVO).

For reflection travel times to offsets substantially less than the reflector depth such as between source 10 and receivers 14 and 16, hyperbolic normal moveout, Δt, as conventionally computed from (5) yields quite satisfactory results. It has been found however, that for very long offsets and shallow reflections whose depth of burial is comparable to or less than the receiver offset, such as the offset between source 10 and receiver 18, FIG. 1, the normal moveout corrections as conventionally approximated tend to overcorrect the recorded reflection times.

There is a need for a method for introducing a second-order normal moveout correction to reflection travel times emanating from bedding planes whose depth of burial are small compared to the source-receiver offset.

SUMMARY OF THE INVENTION

This invention is a computer-aided method for processing signals representative of seismic wavefields reflected from subsurface earth strata, the wavefields having propagated along wide-angle travel paths following emanation from an acoustic source and reception by an array of spaced-apart acoustic receivers offset by a preselected distances remotely from said source. The signals are gathered into a signal matrix storage means, formatted as a function of travel time versus offset distance. The signals resident in the matrix are scanned to determine a stacking velocity. Using the so-determined stacking velocity, hyperbolic moveout is computed and applied to the gathered signals as a function of the square of the wavefield travel time and the square of the offset distance to provide a first-order rectified acoustic-signal gather. The rectified acoustic-signal gather is next scanned to determine a residual velocity. Using the residual velocity, a linear moveout delay is computed and applied to the rectified acoustic-signal gather as a function of the first power of the travel time and the fourth power of the offset distance to define a second-order rectified acoustic-signal gather.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 2:
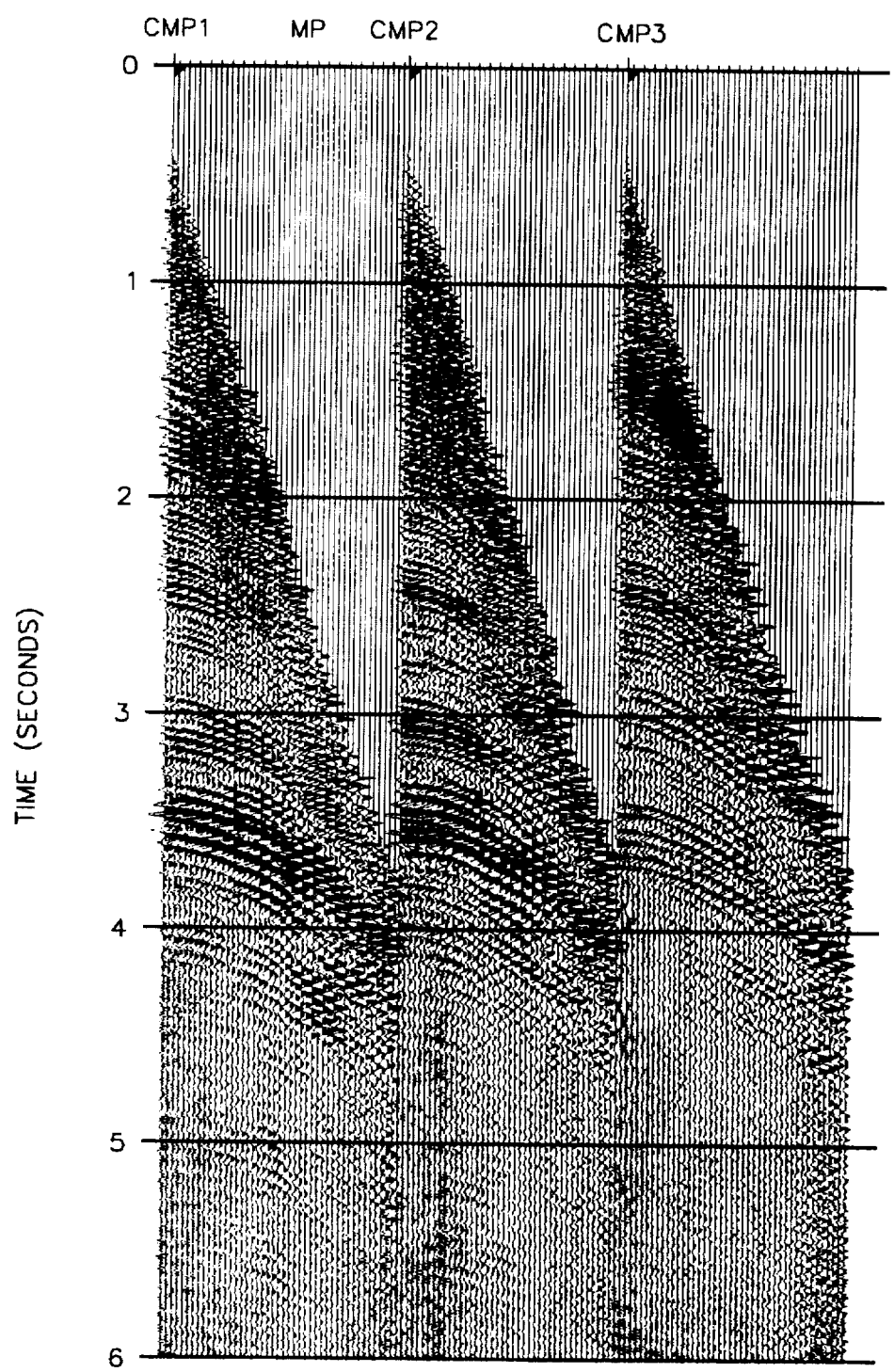
FIG. 2 illustrates a raw seismic record section showing time scale traces uncorrected for normal moveout.
Figure 3:
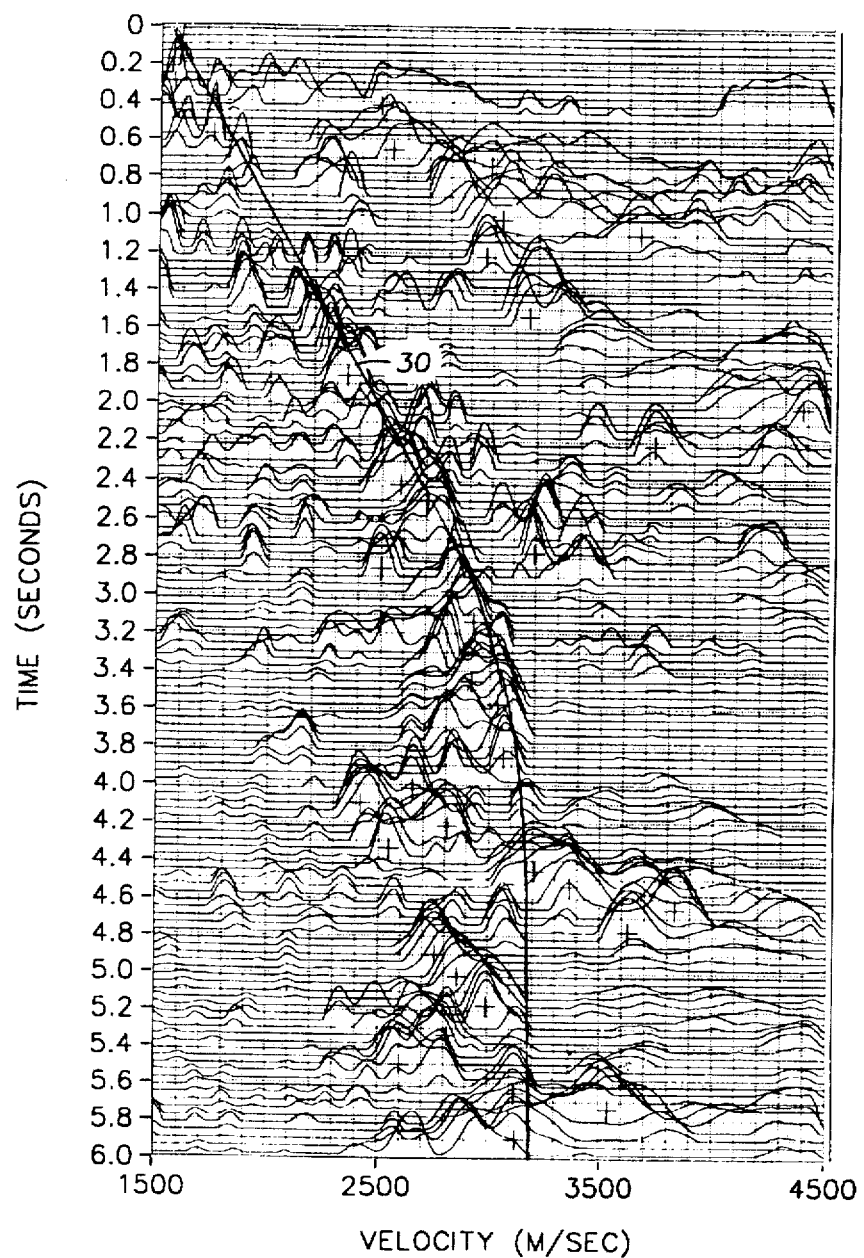
FIG. 3 is an example of a velocity analysis of the CMP 1 gather.
Figure 4:
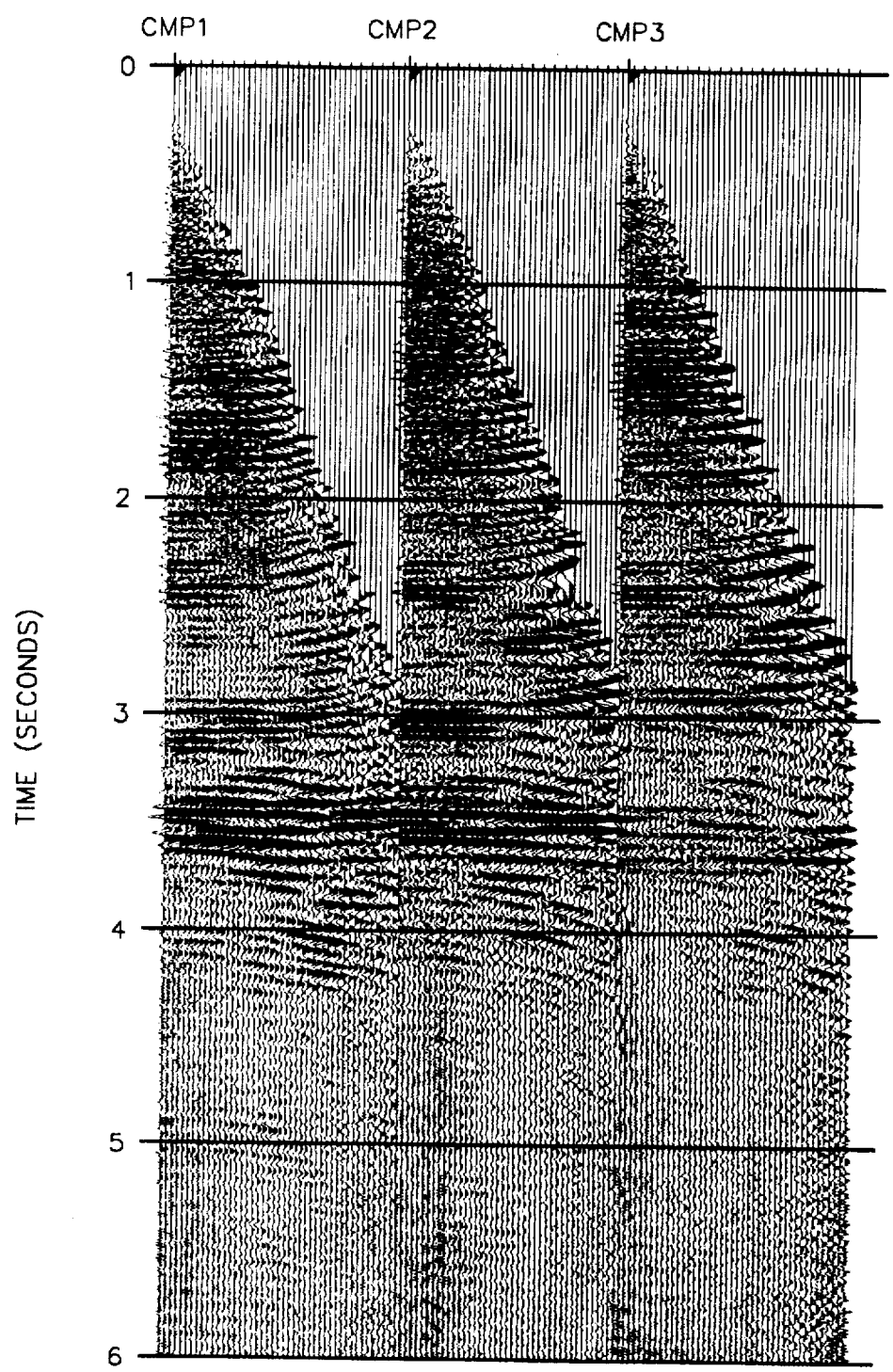
FIG. 4 shows the overcorrection of shallow reflection times from the section of FIG. 2 after application of hyperbolic normal moveout as calculated using the stacking velocity derived from the velocity analysis of FIG. 3, in the presence of offsets that are large in comparison to the reflector depth.

FIG. 4 shows the record section of FIG. 2, presented earlier, after application of a conventional first-order hyperbolic normal moveout correction as determined using the stacking velocity shown in FIG. 3. The very shallow reflection times, earlier than about 3.0 seconds, exhibit a residual upwardly-curled overcorrection at very long offsets. The overcorrection is due in part to the inadequacy of the quadratic two-term hyperbolic moveout approximation given by formulation (5) when applied to long offsets.

Figure 1:
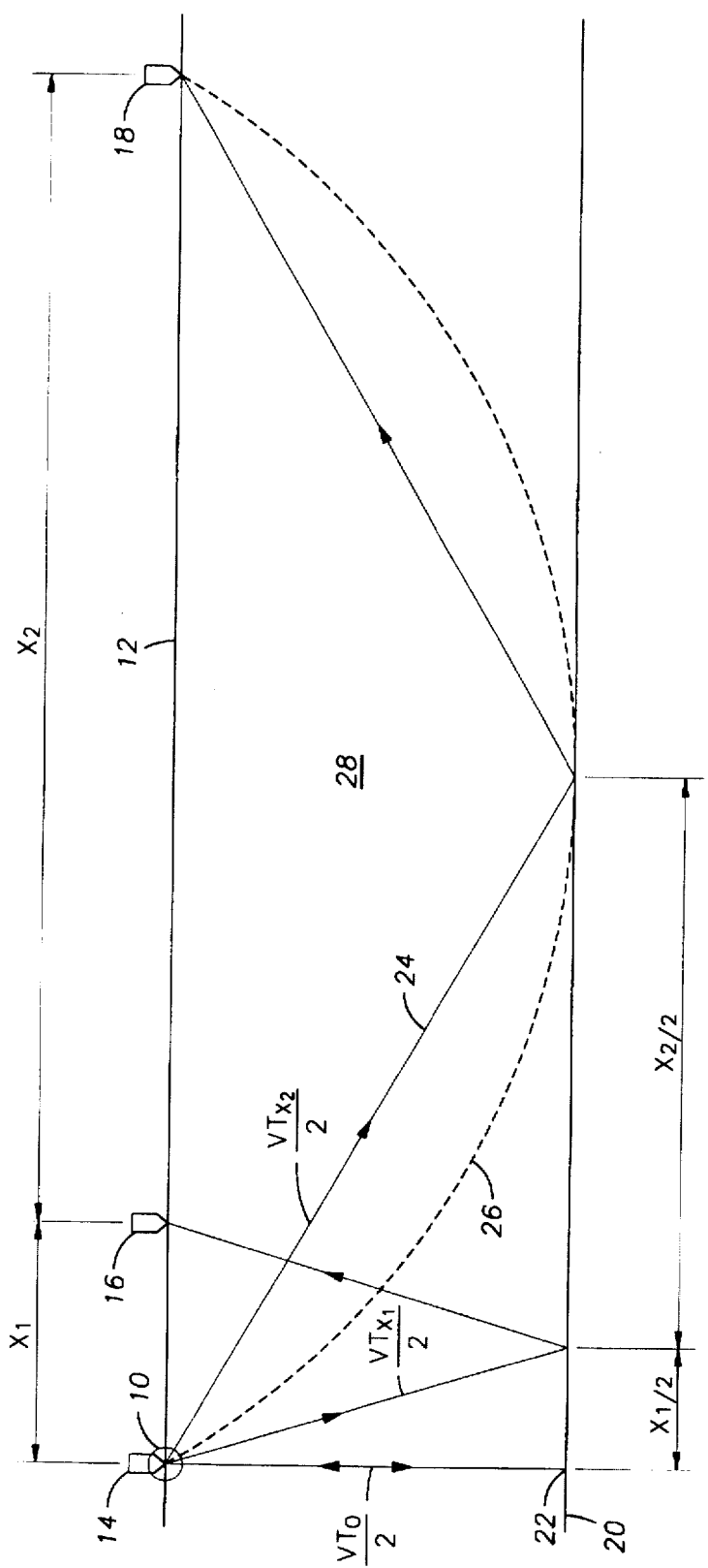
FIG. 1 is illustrative of the trajectories of a seismic wavefield between a source and an array of spaced-apart receivers.

In addition to the above consideration, at offsets that are comparable to or greater that the depth of burial of a reflecting stratum, a wavefield does not necessarily propagate along a straight-path trajectory such as 24, FIG. 1. A wide-angle reflection of that ilk may tend to propagate along a curved path 26 as a refracted reflection in the presence of a selected velocity sequence. Other sources of uncertainty may arise from inaccurate knowledge of the transverse anisotropic characteristics of rock formation 28 of FIG. 1. In the particular example of FIG. 4, the conventional moveout correction overcorrected the reflection travel times. However, it should be understood that the reverse circumstance may occur in selected environments.

As earlier explained, $V_s$, the stacking velocity is computed assuming wavefield propagation along straight paths in an isotropic medium characterized by reasonably horizontal bedding. That assumption may be unwarranted in the presence of shallow reflectors and great offsets. Accordingly, in accordance with this invention, the hyperbolic stacking velocity $V_s$ in the bi-quadratic term in (4) is replaced by a bi-quadratic residual velocity W. Bi-quadratic velocity W is a residual velocity that includes the effects of both path curvature and anisotropicity as well as other unrecognized but disturbing perturbations.

In operation, W, the residual velocity, is determined from the slope of $$T_{XQ} = T_o + (X/W)^4, \qquad (6)$$

where $T_{XQ}$ is the first-order travel time $T_X$ to offset X corrected for hyperbolic moveout and $T_o$ is the zero-offset travel time as defined before. That is, the $T_{XQi}$ are the respective reflection travel times read from the gathers in FIG. 4. Given W, a second order residual linear moveout correction $\Delta Q$ can be computed as a function of the first power of the source-to-receiver travel time and the fourth power of the corresponding source-to-receiver offset distances to define a bi-quadratic acoustic signal gather in the bi-quadratic domain:

$$T_{XQ} - T_o = \Delta Q = (X/W)^4. \qquad (7)$$

Figure 5:
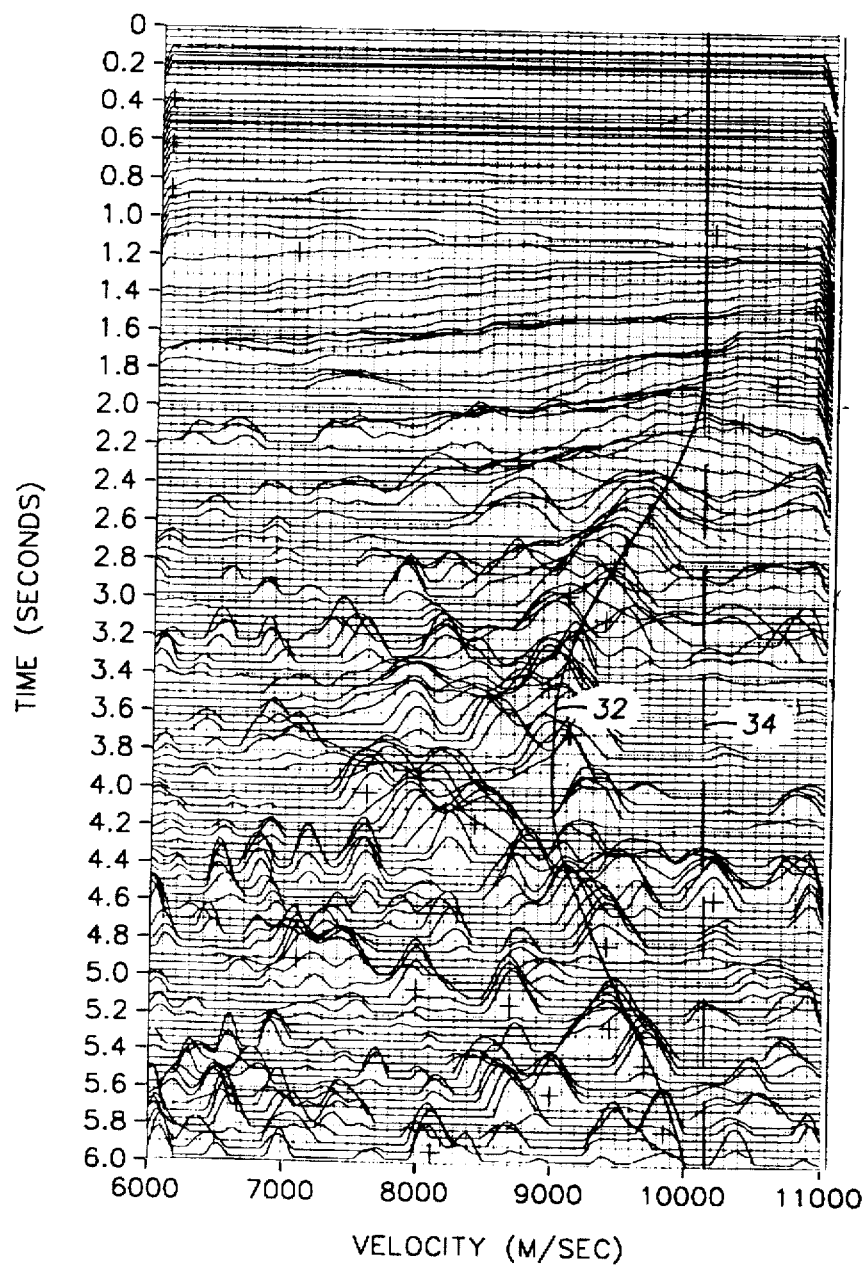
FIG. 5 is an example of a linear bi-quadratic residual velocity analysis.

FIG. 5, to be explained in detail later, shows the result of scanning the reflection travel times of FIG. 4 for residual velocity, W, indicated by curve 32.

Figure 6:
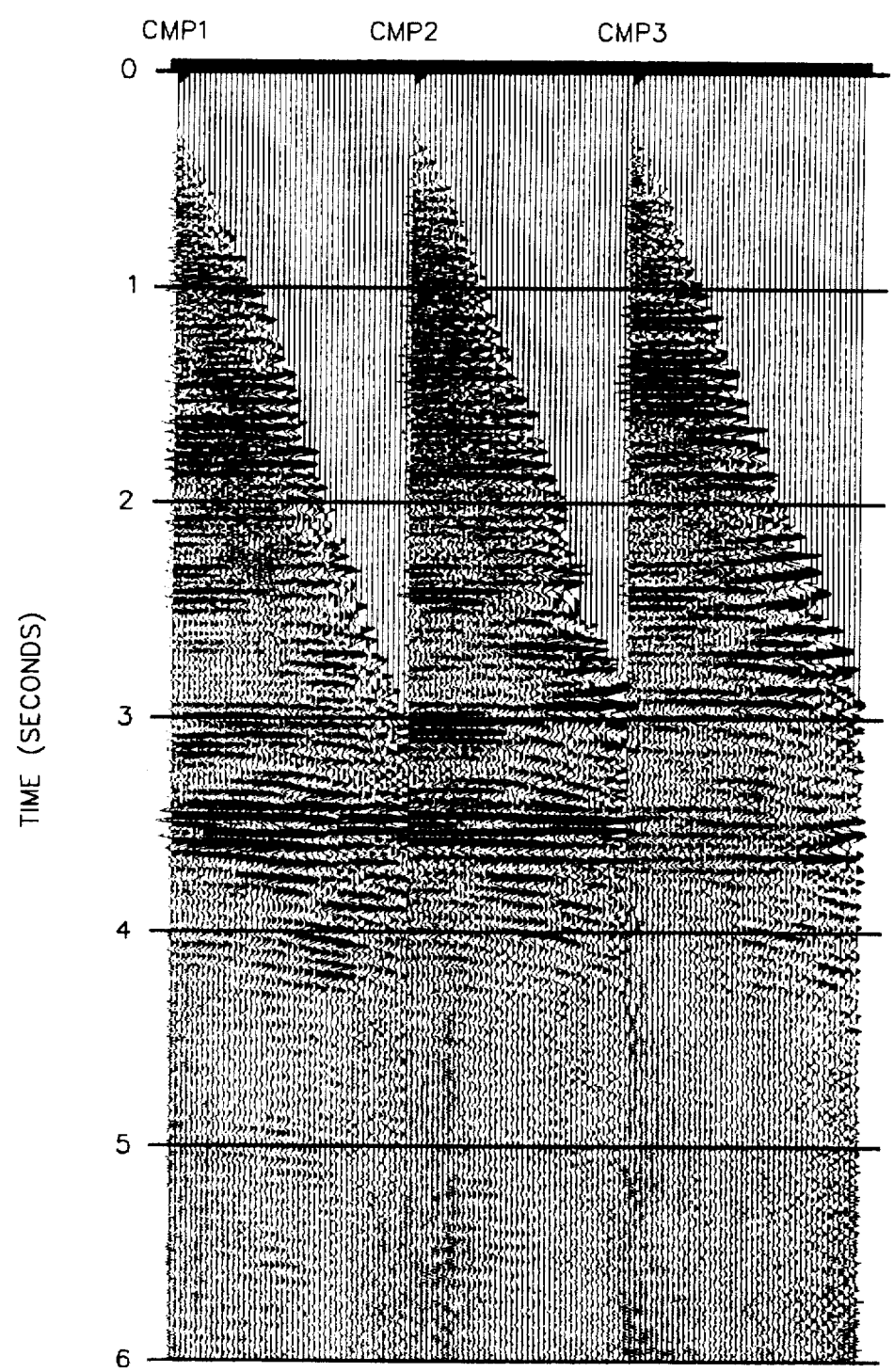
FIG. 6 shows the data of FIG. 4 after application of a residual bi-quadratic normal moveout term.

Following application of $\Delta Q$, the bi-quadratic acoustic signal gather is reformatted from the bi-quadratic domain to the linear domain as shown in FIG. 6. As a matter of interest, the downwardly-curved seismic events from about 3.75 to 4.254 seconds are spurious multiple reflections.

Figure 7:
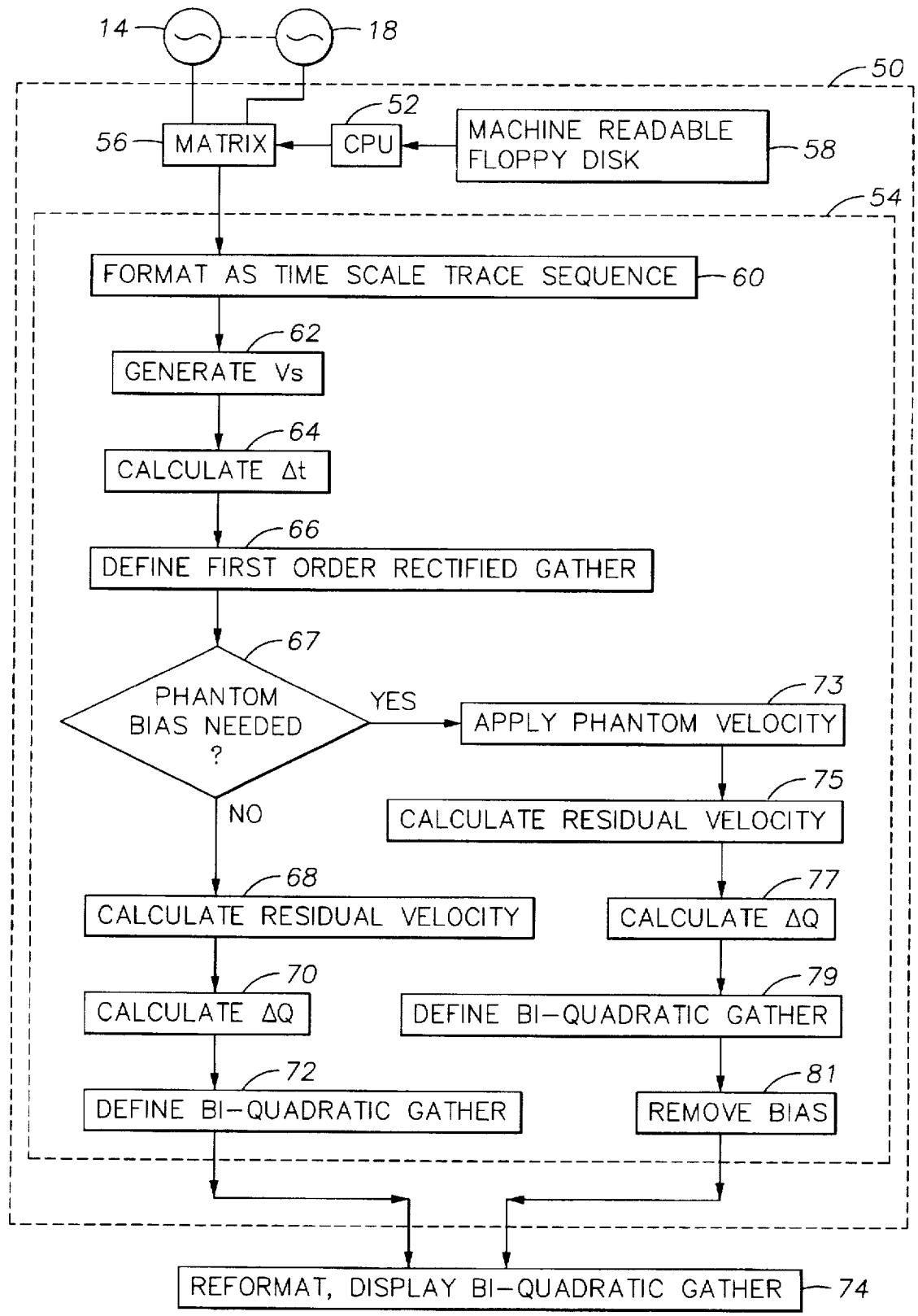
FIG. 7 is a flow diagram presented to provide a better understanding of this invention.

Typically, in operation, the seismic data recorded in the field are sent to a central processing center as earlier explained where the data are processed in accordance with the flow diagram of FIG. 7 to provide a model of the subsurface. Data processing is usually done with the aid of a general purpose digital computer, 50, of any suitable type programmed to perform the required manipulation of the digital data words representative of the acoustic wavefields reflected from subsurface strata. As is well known, a preferred computer includes a CPU (central processing unit), 52, an ALU (arithmetic logic unit), 54, and a memory matrix, 56, for receiving and formatting the data words representative of reflected seismic wavefields sensed by the receiver arrays 14–18. The computer may be programmed to perform the requisite tasks by inputting instructions using any convenient well known means such as, by way of example but not by way of limitation, a manual-keyboard input or instructions stored on a machine-readable floppy disk 58.

Initially, the computer, 50, is programmed to format the received digitized acoustic data signals (the data) in a linear domain as a function of source-to-receiver travel times versus the corresponding offset distances as a series of time-scale traces. Next, the computer is programmed to scan the data to measure the first-order stacking velocity at step 62 using any well-known velocity-analysis program such as the VELAN® process earlier mentioned. FIG. 3 is a typical output from the VELAN® program, using data input from CMP 1, FIG. 2. The stacking velocity as a function of depth is indicated by the curve 30. A hyperbolic normal moveout correction is computed using formulation (5) at step 64 and the stacking velocity as shown in FIG. 3 and is applied to the three CMP gathers of FIG. 2 at step 66 to define a first-order rectified signal gather as shown in FIG. 4.

The computer 50 is now programmed to scan the first-order rectified signal gather of CMP 1, FIG. 4, for residual velocity, W, again using the VELAN® program above, at step 68 to provide the analytical results of FIG. 5. Using the sodetermined residual velocity, a residual linear moveout correction, $\Delta Q$, is computed at step 70 using formulation (7). The residual moveout correction is applied to the three gathers of FIG. 4 as a function of the first power of the source-to-receiver travel time and the fourth power of the offset distances to define bi-quadratic acoustic-signal gathers at step 22.

Finally, the computer is instructed to reformat the bi-quadratic acoustic signal gathers from the bi-quadratic domain to the linear domain at 74 thereby to provide a visual model of the subsurface of the earth beneath the region of survey as shown in FIG. 6.

In the interest of computer economy, the same VELAN® scanning process is preferably used for deriving both the first-order stacking velocity and the residual stacking velocity. However, the preferred velocity-analysis program expects to see increasingly longer reflection travel times with increasing offset distance rather than the upward curl as seen in FIG. 4. In that case, an alternate method is used, branching at step 57 wherein a constant arbitrary phantom velocity is applied to provide a positive linear increment of travel time versus offset to the first-order rectified acoustic signal gather 73 prior to determining the residual stacking velocity at step 75. $\Delta Q$ and a phantom bi-quadratic gather are derived at steps 77 and 79. In FIG. 5, the phantom velocity is indicated by the dashed, straight-line curve 34. The residual velocity function is the bulge represented by the solid curve 32. The linear slope in reflection times due to introduction of the phantom-velocity bias is later removed 81. Preferably the phantom velocity is of the same order of magnitude as the estimated formation velocity. A model of the structure of a volume of the subsurface of the earth is provided at 74.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. Apparatus for processing acoustic signals representative of seismic wavefields reflected from strata that are characterized by depths of burial that are comparable to and less than the offsets between an acoustic wavefield source and the respective ones of an array of acoustic-signal receivers, comprising:

a computer means including
   a) a memory matrix for receiving and formatting acoustic signals, detected by said array of acoustic-signal receivers, in a linear domain as a function of wavefield source-to-receiver travel times versus the offset distances;
   b) a central processing unit, the central processing unit responsive to executable computer instructions for
      i) scanning the formatted acoustic signals to derive a first-order stacking velocity,
      ii) computing a hyperbolic moveout correction from said first-order stacking velocity, iii) applying said hyperbolic moveout correction to the respective formatted acoustic signals as a function of the square of said source-to-receiver travel times versus the square of the corresponding source-to-receiver offsets for defining a first-order rectified acoustic-signal gather.

iv) scanning said first-order rectified acoustic-signal gather to derive a residual velocity.

v) calculating a residual moveout correction from said residual velocity, vi) applying said residual moveout correction to said first-order rectified acoustic-signal gather as a function of the first power of the source-to-receiver travel times versus the fourth power of the corresponding source-to-receiver offset distances for defining an acoustic-signal gather in a bi-quadratic domain; and c) means for reformatting said bi-quadratic acoustic signal gather from the bi-quadratic domain to the linear domain to provide a model of a volume of the subsurface of the earth.

2. As an article of manufacture, a computer-readable medium for storing the computer instructions b(i) through b(vi) recited in claim 1.

3. The method for processing seismic signals representative of wide-angle reflected seismic wavefields using the apparatus as defined by claim 1.

4. A computer-aided method for processing signals representative of wide-angle reflected seismic wavefields emanating from an acoustic source and received by an array of acoustic receivers separated from said source by preselected offset distances, comprising:

a) gathering said signals into a signal matrix formatted as a function of travel time versus offset distance;

b) scanning the signals resident in said signal matrix to determine a stacking velocity;

c) using said stacking velocity to compute a hyperbolic moveout correction;

d) applying the hyperbolic moveout to the gathered signals as a function of the square of the wavefield travel time and the square of the offset distance for providing a first-order rectified acoustic-signal gather;

e) scanning said rectified acoustic-signal gather to define a residual velocity;

f) using said residual velocity to compute linear moveout delay;

g) applying said linear moveout delay to said rectified acoustic-signal gather as a function of the first power of the travel times and the fourth power of the offset distances for defining a second-order biquadratic acoustic-signal gather.

5. A computer-aided method for processing signals representative of seismic wavefields reflected from subsurface earth strata, the wavefields having propagated along wide-angle travel paths following emanation from an acoustic source and reception by an array of acoustic receivers offset by respective preselected distances remotely from said source, comprising:

a) gathering said signals into a signal matrix formatted as a function of travel time versus offset distance;

b) scanning the signals resident in said signal matrix to determine a stacking velocity;

c) using said stacking velocity, computing a hyperbolic moveout;

d) applying said hyperbolic moveout to the gathered signals as a function of the square of the wavefield travel times and the square of the offset of each said receiver for providing a first-order rectified acoustic-signal gather;

e) using a preselected phantom velocity, computing and applying a positive linear time increment as a function of travel time and the fourth power of the offset distance to provide a phantom gather;

f) scanning the phantom gather to determine a residual velocity;

g) computing a linear moveout from said residual velocity;

h) applying said linear moveout correction to said phantom gather for defining a second-order bi-quadratic acoustic-signal gather.

6. The method as defined by claim 4, comprising:

restoring the offset distances in said second-order acoustic signal gather to the linear domain from the bi-quadratic domain for modeling a volume of the subsurface of the earth.

7. The method as defined by claim 5, comprising:

restoring the offset distances in said second-order acoustic signal gather to the linear domain from the bi-quadratic domain to provide a model of a volume of the subsurface of the earth.

8. A method for processing signals representative of wide-angle seismic wavefields reflected from subsurface earth strata received by an array of acoustic receivers offset remotely from a wavefield source by preselected distances, comprising:

a) formatting said signals in a gather as a function of travel time versus offset distance;

b) scanning the signals resident in said gather to measure a stacking velocity;

c) using said stacking velocity, computing a hyperbolic moveout correction d) providing a first-order rectified acoustic-signal gather by applying the hyperbolic moveout correction to the gathered signals as a function of the square of the wavefield travel time and the square of the offset distance;

e) scanning said rectified acoustic-signal gather to define a residual velocity;

f) using said residual velocity to compute linear moveout delay;

g) defining a second-order bi-quadratic acoustic signal gather by applying said linear moveout delay to said rectified acoustic-signal gather as a function of the first power of the travel times and the fourth power of the offset distances; and h) modeling the structure of a volume of the subsurface of the earth by reformatting the second-order bi-quadratic acoustic signal gather from the bi-quadratic domain to the linear domain.

* * * * *